May 16, 1939. E. H. LAND 2,158,129
DISPLAY DEVICE EMPLOYING POLARIZED LIGHT
Filed June 1, 1938
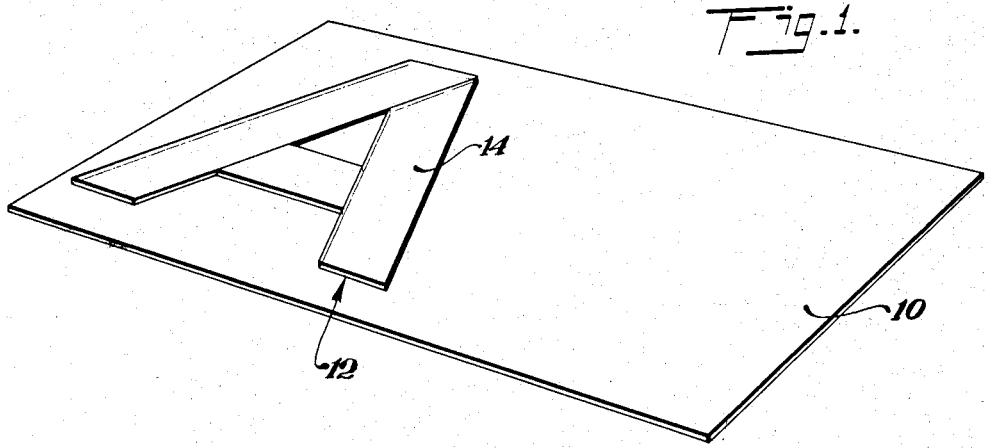
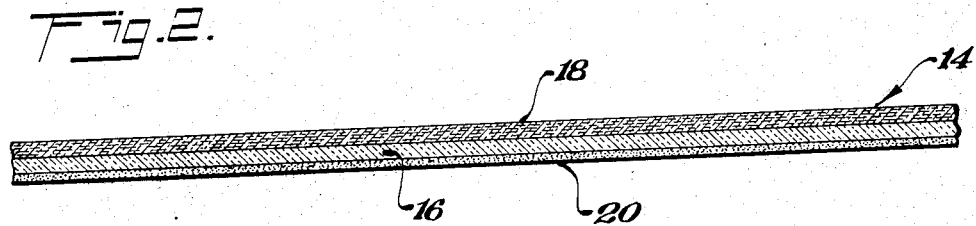
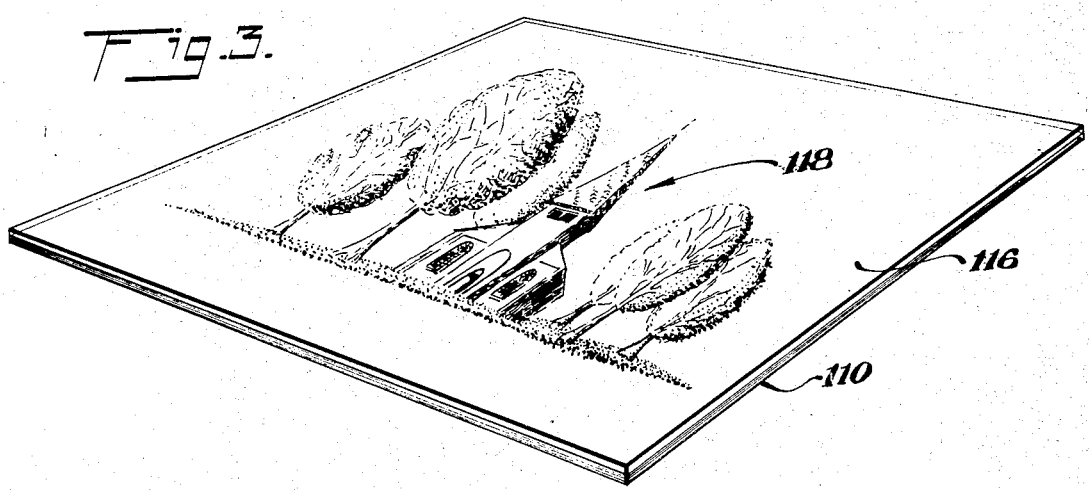
INVENTOR
Edwin H. Land
By Brown & Jones
ATTORNEYS Patented May 16, 1939

2,158,129

UNITED STATES PATENT OFFICE 2,158,129

DISPLAY DEVICE EMPLOYING POLARIZED LIGHT

Edwin H. Land, Wellesley Farms, Mass., assignor, by mesne assignments, to Polaroid Corporation, Dover, Del., a corporation of Delaware Application June 1, 1938, Serial No. 211,178

15 Claims. (Cl. 40—130)

This invention relates to optical apparatus such as a display device employing polarized light, and more specifically a device of the character described giving color effects.

In general, it is an object of the invention to provide a device of the character described which will efficiently perform the purposes for which it is intended, which is simple and economical of construction, which can be expeditiously, conveniently and safely manipulated, and which can be readily manufactured and assembled.

Other objects of the invention are to provide an article having a design thereon, the colors of which change with relative changes in position of the eye of an observer and/or the article; to provide such an article which is opaque and which may be flexible; to provide the material of the design ready to be applied to the base of the article; and to provide such design material as laminated film which may be flexible.

Other objects of the invention will in part be obvious and will in part appear hereinafter.

The invention accordingly comprises an article of manufacture possessing the features, properties, and relation of elements which will be exemplified in the article hereinafter described and the scope of the application of which will be indicated in the claims.

For a fuller understanding of the nature and objects of the invention, reference should be had to the following detailed description, taken in connection with the accompanying drawing, in which:

Figure 1 is a perspective view of an article embodying one form of the invention;

Fig. 2 is a view in section of some of the elements of the article shown in Fig. 1; and Fig. 3 is a perspective view of a modification of the article shown in Fig. 1.

Figure 1 shows an article presenting a surface having a design associated therewith. To the eye of a stationary observer, different portions of the design appear in different colors. If the observer moves, or if the article is moved with respect to a stationary observer, the respective colors of the several portions change.

In the drawing, 10 denotes a reflecting surface of an article. There is a design associated with this surface. The design may take any form and is shown in Fig. 1 illustratively as the letter A, which has the reference numeral 12. The various parts of the design element 12 may be made up of a laminated strip 14, shown in section in Fig. 2. This strip may comprise birefringent material 16, for example Cellophane or Cellophane-like material, or a birefringent plastic or resin, or any other birefringent material, such for example as the birefringent materials specified in my issued United States Patent No. 2,018,214 at page 2, lines 13 to 19 inclusive.

On one surface of the layer 16 there is provided a second layer or film 18 of light-polarizing material. This may be in the form of a sheet containing optically oriented light-polarizing crystals, such for example as the material sold under the trade name "Polaroid", or it may be in the form of a coating of oriented crystalline polarizing material on the layer 16, such as the coating described in United States Patent No. 2,087,795. Any structure providing a light-polarizing surface on a birefringent supporting layer is deemed to be within the scope of my invention. Preferably, the polarizing axis of the surface should be angularly positioned with respect to a principal optical direction of the birefringent layer.

On the other face of the birefringent layer 16, and opposite to the polarizing layer 18, there may be a layer of adhesive 20. This adhesive may be of a latex type, or it may comprise a resin, or may be of any other suitable material. The entire strip may be relatively thin and have the appearance of the material sold as Scotch tape. The adhesive layer 20 is used to cause the tape to adhere to the surface 10.

The surface 10 may be any light-reflecting surface, such as a mirror surface, or the surface of a paper covered by foil, or the like, or a metallic surface, such as a metallic foil supported or not, as desired, upon some rigid or flexible material such as glass, paper, leather, and the like.

Light incident on the exposed face of the polarizing surface 14 and traversing that surface is polarized. This polarized light then traverses the birefringent layer 16, impinges upon the reflecting surface 10, again traverses the birefringent layer 16, and impinges upon the under-surface of the polarizing layer 18, through which it passes to the eye of an observer. It will thus be apparent that in operation the device of the present invention provides a structure such that light traversing the device traverses successively a light-polarizing element, a birefringent element, and a light-polarizing element. The reflecting surface 10 is utilized to insure the double use of the polarizing surface 18 as both a polarizer for the incident light and an analyzer for the reflected light. The birefringent layer is traversed twice by the incident and reflected light, and it will be apparent that slight differences in the relative position of an observer and the design on the surface 10 will result in substantially increased path lengths through the birefringent material of light reaching the eyes of the observer.

If the polarizing axis of the surface 18 is non-parallel and non-perpendicular to a principal optical direction of the birefringent layer 15, vivid colors will be imparted to the reflected light. In this connection reference is made to my issued United States Patent No. 2,018,214, patented October 22, 1935, for Advertising display device, for a fuller discussion of the optics involved in a somewhat similar device.

It will be apparent that many diverse and striking designs may be produced, all of which are visible in reflected light and all of which comprise essentially a light-polarizing surface, a birefringent layer, and a reflecting layer. These designs may be produced at small cost, if a device such as is shown in Figs. 1 and 2 is employed, without wasting any of the polarizing or birefringent material. The reflecting surface may be supplied by a cheap metallized paper, such as is used for example in fancy wrappings or the like, and the applied birefringent and polarizing material may be flexible and may conform to the shape taken by the paper when in use. Such material may be easily shipped, cut to size, and employed in a wide range of commercial applications.

Furthermore the device shown in Figs. 1 and 2 is eminently suited for car card displays, bill boards and the like, where vivid spot designs may be affixed to reflecting surfaces, and where the colors of the designs may change rapidly, even without any moving parts, as an observer moves past the display. No light source is required if the display is an out-of-doors sign.

The strip shown in Fig. 2 may be supplied in roll form as is adhesive tape, and it may be employed by an artist or other workman in the production of designs on reflecting surfaces already in place by affixing the strip to the surface at the place of use. It will be apparent that if sections of the strip are positioned angularly with respect to each other on the reflecting surface, each section will give a different color to an observer.

In Fig. 3 there is shown a modification of the invention. In this form the birefringent layer 116 overlies substantially the entire surface of the reflecting element 110. The light-polarizing surface 118 may be formed by applying light-polarizing material in a predetermined design to the birefringent layer. Such a design may be formed for example in the manner described in greater detail in the copending application of Land and Mahler, Serial No. 207,182, filed May 11, 1938. In this form of the invention the elements 110, 116 may take the form of a laminated sheet of Cellophane or Cellophane-like material to a metallized paper backing, with the Cellophane adhesively affixed to the reflecting surface of the paper, or, as previously mentioned, the reflecting surface may comprise any other suitable means, and the birefringent layer may be laminated thereto or affixed, or merely in contact therewith.

It is also to be understood that in any form of the invention described the elements may be separate and out of contact with each other, although a unitary laminated structure is preferred.

While in the forms of the invention heretofore described the design has been spoken of as formed in means providing a polarizing surface, it is to be understood that the design may be effected by means of the birefringent layer. For example, if the structure in Fig. 1 comprised a reflecting surface having affixed thereto sections of birefringent material so as to form a design thereon, the entire element, including those portions of the reflecting surface not covered by the birefringent material, might be coated with a light polarizing layer. Such a structure is to be deemed to fall within the scope of my invention. It will be understood therefore that while preferably the design formed upon the reflecting surface is formed in the polarizing layer, it may be formed in either or both the polarizing and birefringent layers.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In combination, a birefringent element, means on one surface thereof forming a light-polarizing surface having its polarizing axis angularly positioned with respect to a principal optical direction of said birefringent means, and an adhesive on the opposite surface of said birefringent means.

2. In combination, a thin, flexible strip of birefringent material having one surface coated with adhesive and the opposite surface coated with a polarizing layer having its polarizing axis angularly positioned with respect to a principal optical direction of said birefringent strip.

3. A transparent tape comprising a birefringent cellulosic strip, means on one surface thereof forming a light-polarizing layer with its polarizing axis angularly positioned with respect to a principal optical direction of said strip, and an adhesive on the opposite face of said strip for bonding said strip to a support.

4. A display device comprising means providing a reflecting surface, birefringent means positioned adjacent said surface and adapted to intercept predetermined light rays incident thereon and reflected therefrom, and light-polarizing means positioned adjacent said birefringent means and on that side thereof farthest from said reflecting surface to intercept said rays.

5. A display device comprising means providing a reflecting surface, birefringent means positioned adjacent said surface and adapted to intercept predetermined light rays incident thereon and reflected therefrom, and light-polarizing means positioned adjacent said birefringent means and on that side thereof farthest from said reflecting surface to intercept said rays, said surface-providing means, said birefringent means, and said light-polarizing means being bonded together to form a unitary structure.

6. A display device comprising means providing a reflecting surface, birefringent means positioned adjacent said surface and adapted to intercept predetermined light rays incident thereon and reflected therefrom, and light-polarizing means positioned adjacent said birefringent means and on that side thereof farthest from said reflecting surface to intercept said rays, said light-polarizing means comprising polarizing areas adapted to form a predetermined design.

7. A display device comprising means providing a reflecting surface, birefringent means positioned adjacent said surface and adapted to intercept predetermined light rays incident thereon and reflected therefrom, and light-polarizing means positioned adjacent said birefringent means and on that side thereof farthest from said reflecting surface to intercept said rays, said birefringent means being bonded to said light-polarizing means and forming therewith a predetermined design.

8. A new article of manufacture comprising a light-polarizing film, a birefringent film, and means providing a reflecting surface, the birefringent film being positioned between the surface and the polarizing film and underlying the polarizing film, at least one of said films being in the form of a design.

9. A new article of manufacture comprising a light-polarizing film, a birefringent film, and means providing a reflecting surface, the birefringent film being positioned between the surface and the polarizing film and underlying the polarizing film, both of said films being in the form of a design.

10. A display device comprising, in combination, a paper support having a light-reflecting surface, birefringent material applied to said surface, and light-polarizing material overlying said birefringent material.

11. A display device comprising, in combination, a paper support having a light-reflecting surface, birefringent material applied to said surface, and light-polarizing material overlying said birefringent material, said reflecting paper, said birefringent material, and said light-polarizing material being bonded together to form a unitary structure.

12. In combination, opaque supporting means having a reflecting surface, birefringent means affixed to said surface, and light-polarizing means affixed to the opposite surface of said birefringent means, all of said elements forming a unitary structure.

13. In combination, opaque supporting means having a reflecting surface, birefringent means affixed to said surface, and light-polarizing means affixed to the opposite surface of said birefringent means, all of said elements forming a unitary structure, said light-polarizing means comprising light-polarizing areas forming a design and having their polarizing axes parallel and at a predetermined angle with a principal optical direction of said birefringent means.

14. In combination, means providing a metallic reflecting surface, a birefringent film adhesively secured to said surface, and a film of light-polarizing material positioned against at least a part of said birefringent film.

15. In combination, a film of birefringent material, a metallic film secured to one surface of said birefringent film and a film of light-polarizing material spread over at least a portion of the opposite surface of said birefringent film.

EDWIN H. LAND.